United States Patent [19]
Zajac

[11] 4,119,984
[45] Oct. 10, 1978

[54] EYEPIECE

[76] Inventor: Cyril Zajac, P.O. Box 1761, Clifton, N.J. 07015

[21] Appl. No.: 793,264

[22] Filed: May 3, 1977

[51] Int. Cl.² .................. G03B 13/02; G02B 23/16
[52] U.S. Cl. .................................... 354/219; 350/57
[58] Field of Search .............................. 354/150–155, 354/219, 287; 351/61; 350/57, 65, 175 E; 24/735 C, 73 B, 81 B

[56] References Cited

U.S. PATENT DOCUMENTS

| 169,917 | 11/1875 | Nystrom | 350/65 |
|---|---|---|---|
| 2,351,747 | 6/1944 | Eckert | 350/57 UX |
| 3,753,611 | 8/1973 | Ebbesen | 350/175 E UX |
| 3,842,431 | 10/1974 | Sakuma | 354/287 |
| 4,051,496 | 9/1977 | Iida et al. | 354/219 |

FOREIGN PATENT DOCUMENTS

| 570,715 | 2/1933 | Fed. Rep. of Germany | 354/219 |
|---|---|---|---|
| 293,920 | 1/1954 | Switzerland | 350/57 |
| 368,603 | 3/1932 | United Kingdom | 354/219 |

*Primary Examiner*—Donald A. Griffin
*Attorney, Agent, or Firm*—Mel K. Silverman; David A. Jackson; Richard M. Goldberg

[57] ABSTRACT

An eyepiece for use in conjunction with a viewfinder of a camera including a tube, prescription lens adapted to be held in the tube by a flexible ring, a rubber eye rim attached to the tube and means for attaching the tube to a camera viewfinder.

4 Claims, 4 Drawing Figures

EYEPIECE

PRIOR ART

The following U.S. patents are considered pertinent: U.S. Pat. No. 169,917 U.S. Pat. No. 3,042,827 U.S. Pat. No. 3,533,686 U.S. Pat. No. 3,753,611 U.S. Pat. No. 3,868,711 U.S. Pat. No. 3,931,630.

BACKGROUND OF THE INVENTION

This invention relates to an eyepiece construction utilized in conjunction with a camera viewfinder.

Persons who used prescription glasses experienced difficulty in using the viewfinder of a camera since the lens of the glasses necessarily causes the eye to be positioned away from the viewfinder. Thus, outside light enters the eye and tends to reduce the intensity of the object alternatively if the glasses are removed, the camera user has difficulty in seeing the object to be photographed since the lens in the viewfinder does not fit his eye prescription.

It is an object of this invention to provide an eyepiece for a camera viewfinder which permits the camera user to remove his glasses and to view the object being photographed through a lens which fits his prescription.

It is a further object of this invention to provide such an eyepiece which permits insertion of a lens of any prescription.

Further objects of this invention will become evident in view of the following detailed disclosure.

SUMMARY OF THE INVENTION

In accordance with this invention, the eyepiece comprises a tube with an eye rim attached at the outside of one end and means for attaching the tube to a camera viewfinder and the outside of the end opposite the eye rim. A prescription lens is inserted into the tube and secured therein adjacent the means for attaching the eyepiece to the viewfinder. The lens securing means can comprise an O ring so that a clear viewing patch is retained through the tube into the viewfinder. The distance between the eye rim and the lens is the same as the normal length between the eye and the lens of glasses normally worn by the user.

DETAILED DESCRIPTION OF THE PREFERRED EMBODIMENTS

Figure 1:
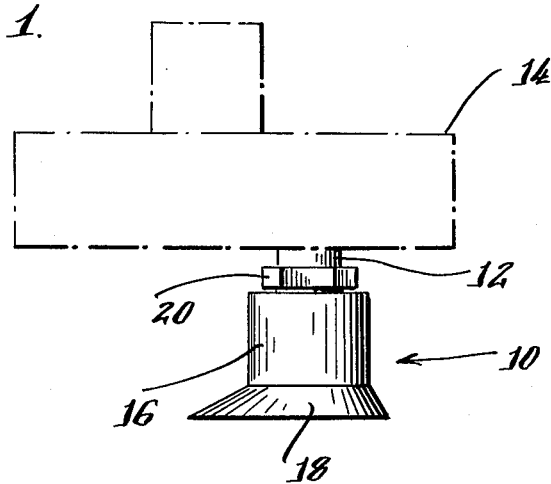
FIG. 1 is a top view of the eyepiece of this invention attached to a camera.
Figure 2:
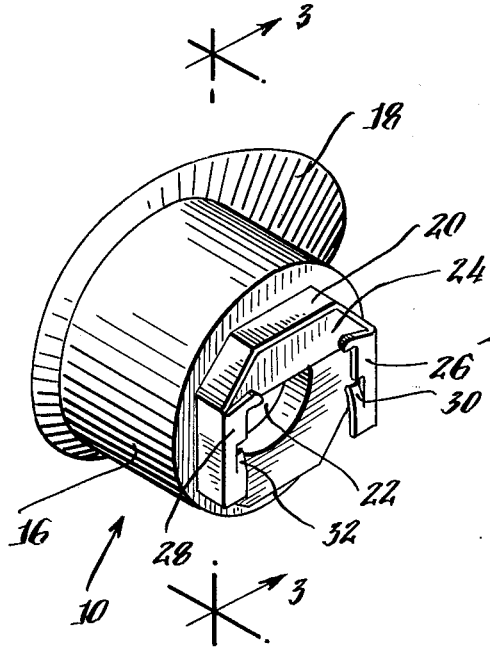
FIG. 2 is a perspective view of the eyepiece.
Figure 3:
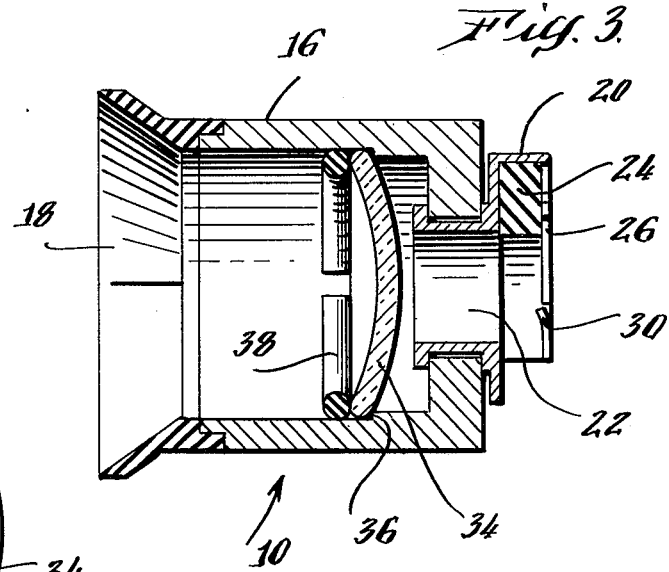
FIG. 3 is a cross-sectional view of the eyepiece of FIG. 2 taken along line 3—3.
Figure 4:
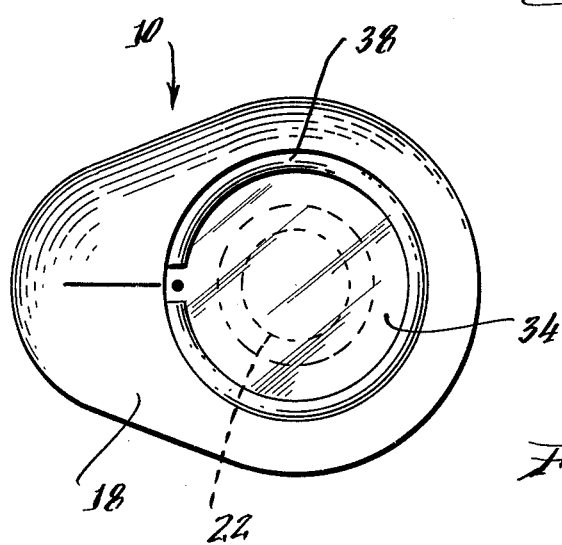
FIG. 4 is a left side view of the eyepiece of FIG. 3.

Referring to FIG. 1, the eyepiece 10 is attached to the viewfinder 12 of camera 14. As shown in figures, the eyepiece 10 includes a tube 16, an eye rim 18 which can be formed of resilient material such as rubber attached to one end of the tube 16 and an adapter clip 20 attached to the opposite end of the tube 16. The adapter clip 20 is snap-fit into opening 22 of tube 16 and includes a resilient member 24 which contacts the top of viewfinder 12 and two hinged arms 26 and 28 that have bent arms 30 and 32 which fit around the rim of the viewfinder 12 and retained the clip 20 on the major portion of the periphery of viewfinder 12.

A prescription lens 34 is retained on shoulder 36 of tube 16 by O ring 38. The O ring can be removed manually to permit replacement of prescription lens 36 with another prescription lens if desired. Optic axis for individuals with astigmation will be aligned with projecting tab on eye rim 18. Eye rim 18, eyepiece 10, tube 16, prescription lens 34, O ring 38, will (should) turn freely on clip 20 360°, vertically or horizontally.

It is to be understood that this invention is not limited to the embodiments specifically shown, but include embodiments which will be evident to the person skilled in the art.

What is claimed is:

1. An eyepiece for use in conjunction with a viewfinder of a camera comprising a tube, means attached to a first end of said tube rotatably securing said tube to a camera viewfinder, an eye rim attached to a second end of said tube, a prescription lens positioned in said tube and means for securing said lens within said tube.

2. The eyepiece of claim 1 wherein the means for securing the lens within said tube comprises an O ring.

3. The eyepiece of claim 1 wherein said means for securing the tube to a camera viewfinder comprises a clip snap fit into one end of said tube and two hinged arms adapted to surround a major portion of the periphery of the viewfinder.

4. The eyepiece of claim 1 wherein said eye rim is formed of a resilient material.

* * * * *